United States Patent
Han

(10) Patent No.: US 11,789,717 B2
(45) Date of Patent: Oct. 17, 2023

(54) GRAPHICS CARD FIRMWARE UPDATING SYSTEM AND UPDATING METHOD THEREOF FOR FAST STARTUP SETTING OF WINDOWS COMPUTER OPERATING SYSTEM AFTER REPLACING GRAPHICS CARD

(71) Applicant: Tai-Sheng Han, New Taipei (TW)

(72) Inventor: Tai-Sheng Han, New Taipei (TW)

(73) Assignee: EVGA CORPORATION, New Taipei (TW)

(*) Notice: Subject to any disclaimer, the term of this patent is extended or adjusted under 35 U.S.C. 154(b) by 80 days.

(21) Appl. No.: 17/517,445

(22) Filed: Nov. 2, 2021

(65) Prior Publication Data
US 2023/0136675 A1 May 4, 2023

(51) Int. Cl.
*G06F 8/65* (2018.01)
*G06T 1/20* (2006.01)
*G06F 8/71* (2018.01)

(52) U.S. Cl.
CPC .............. *G06F 8/65* (2013.01); *G06F 8/71* (2013.01); *G06T 1/20* (2013.01)

(58) Field of Classification Search
CPC .............. G06F 8/65; G06F 8/71; G06T 1/20
USPC ........................................................ 717/168
See application file for complete search history.

(56) References Cited

U.S. PATENT DOCUMENTS

| 2015/0169310 A1* | 6/2015 | Lee-Baron | ................ G06F 8/65 717/170 |
| 2018/0204302 A1* | 7/2018 | Han | .......................... G06T 1/20 |

OTHER PUBLICATIONS

Choi et al., "Secure Firmware Validation and Update for Consumer Devices in Home Networking", 2016, [Online], pp. 39-44, [Retrieved from internet on Feb. 24, 2023], <https://ieeexplore.ieee.org/stamp/stamp.jsp?arnumber=7448561> (Year: 2016).*

(Continued)

*Primary Examiner* — S. Sough
*Assistant Examiner* — Zengpu Wei
(74) *Attorney, Agent, or Firm* — Che-Yang Chen; Law Office of Michael Chen

(57) ABSTRACT

A graphics card firmware updating system and an updating method thereof for fast startup setting of a Windows computer operating system after replacing the graphics card comprise an electronic device, a replaced graphics card, and a comparison unit, the electronic device receives a boot signal to execute a Windows fast startup program, the electronic device has a storage unit comprising an original graphics processing unit identification code, the replaced graphics card is installed in the electronic device and comprises a microcontroller, the microcontroller comprises a microcontroller identification code and a firmware version, the comparison unit comparing whether the microcontroller identification code of the replaced graphics card being the same as an original microcontroller identification code read from the storage unit during the Windows fast startup setting, and executing a firmware updating process or a rebooting process on the electronic device according to whether the comparison being the same.

9 Claims, 6 Drawing Sheets

(56) References Cited

OTHER PUBLICATIONS

Zandberg et al, "Secure Firmware Updates for Constrained IoT Devices Using Open Standards: A Reality Check", 2019, [Online] pp. 71907-71920, [Retrieved from internet on Jun. 24, 2023], <https://ieeexplore.ieee.org/stamp/stamp.jsp?arnumber=8725488> (Year: 2019).*

* cited by examiner

(12) United States Patent

GRAPHICS CARD FIRMWARE UPDATING SYSTEM AND UPDATING METHOD THEREOF FOR FAST STARTUP SETTING OF WINDOWS COMPUTER OPERATING SYSTEM AFTER REPLACING GRAPHICS CARD

BACKGROUND OF THE INVENTION

Field of Invention

The invention relates to a computer operating system updating system and a method thereof, and more particularly to a graphics card firmware updating system and an updating method thereof capable of preventing the graphics card from malfunctioning during fast startup setting of a Windows computer operating system after replacing the graphics card.

Related Art

In today's information society, computer system has become a part of people's lives. Whether it is word processing or daily general affairs processing, almost all rely on computer system for processing or computing.

Graphics card is one of the most basic components of a computer, it is used to convert the display information required by a computer system to drive the computer, and provide progressive or interlaced scanning signals to control the correct display of the computer. Graphics card is also an important component to connect a monitor with a motherboard of a personal computer, and an important device in a "dialogue between human and machine". A graphics card is composed of graphics processing unit (GPU), microcontroller (MCU), memory, circuit board, and heat sink, and among them, GPU is the most important computing core.

Nowadays, graphics cards have more and more additional functions, so some high-end graphics cards, in addition to GPU, will also use MCU with different functions on the circuit board for fan control, lighting control, display module control, temperature detection and overclocking settings. Users, especially computer geeks with high demand for graphics card functions, will purchase high-end graphics cards for replacement.

As for the computer operating system, after the user configures the computer to activate the Windows fast startup function, the system will write a large amount of data to the hard disk and save the data (including the VBIOS information of the graphics card) when the computer is shut down, in order to facilitate the realization that the computer system can quickly enter a working state when the computer is turned on the next time. If the user has replaced the graphics card, and the new graphics card has a GPU of a different model, the operating system will re-initialize the device through the driver and store the new graphics card data (including the Sub System ID (SSID) code) obtained in the hard disk and save the new graphics card data. Therefore, there will be no problem in executing the Windows fast startup under the condition that the GPUs are of different models.

As mentioned in the previous paragraph, the so-called "initialization" is a process of searching for the devices, starting the devices and preparing for completion when the computer is turned on. To explain in more detail, first of all, when the computer is turned on, an entire condition of the devices is searched, such as: whether there is a graphics card installed, how many cards are installed, the model of each of the graphics cards, etc., for example, whether there is a mouse, a keyboard installed and so on. Then, the searched devices are arranged with corresponding communication channels, the devices are activated and stand by, for example, install the graphics card, read the SSID, set the resolution, etc., for example, communication points are opened for the installed mouse through USB enumeration procedure, so that the mouse can report the key signals and the mobile signals smoothly to establish a communication interface, etc., so that each of the devices is ready and standby to complete the initialization process.

If the replaced graphics card has the same GPU model but with a different MCU function version, under the Windows fast startup setting of the current Microsoft operating system, the operating system will not reinitialize the device (because it has the same GPU model, it can be compatible with the original), and will recover from the last saved data. At this time, the computer system is still stored with the VBIOS (including the SSID code) information (the data saved in the hard disk) of the previous graphics card, the Microsoft operating system directly compares the GPU model when executing the Windows fast startup, and will not compare the model or version of the microcontroller (MCU), and the computer will have no problems in operation and execution.

The problem is that if the user updates the firmware of the MCU of the current graphics card, due to the comparison data referenced by the computer's application program is still the VBIOS (including the SSID code) information (the data saved in the hard disk) of the previous graphics card, error in comparison by the computer's application program will cause error in the subsequent firmware update, resulting in the subsequent operation of the graphics card to be abnormal, and the user will need to send the graphics card back to the original manufacturer for repair.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above-mentioned problems, a main object of the invention is to provide a graphics card firmware updating system capable of preventing the graphics card from malfunctioning during fast startup setting of a Windows computer operating system after replacing the graphics card.

A secondary object of the invention is to provide a graphics card firmware updating system capable of avoiding maintenance cost caused by malfunction of the graphics card during fast startup setting of a Windows computer operating system after replacing the graphics card.

Another secondary object of the invention is to provide a graphics card firmware updating method capable of preventing the graphics card from malfunctioning during fast startup setting of a Windows computer operating system after replacing the graphics card.

Yet another secondary object of the invention is to provide a graphics card firmware updating method capable of avoiding maintenance cost caused by malfunction of the graphics card during fast startup setting of a Windows computer operating system after replacing the graphics card.

In order to achieve the above objects, the invention provides a graphics card firmware updating system for fast startup setting of a Windows computer operating system after replacing the graphics card comprising an electronic device, a replaced graphics card, and a comparison unit, the electronic device receives a boot signal to execute a Windows fast startup program, the electronic device has a storage unit, the storage unit comprises an original graphics processing unit identification code, the replaced graphics card is installed in the electronic device, the replaced graphics card comprises a microcontroller, the microcontroller comprises a microcontroller identification code and a firmware version, the comparison unit is executed by the electronic device, the comparison unit further comprises a database in addition to the original graphics processing unit identification code read from the storage unit, the database is a comparison table, the database comprises an original microcontroller identification code and a firmware update data version, the comparison unit compares whether the microcontroller identification code of the replaced graphics card is the same as the original microcontroller identification code during the Windows fast startup setting, and executes a firmware updating process or a rebooting process on the electronic device according to whether the comparison is the same.

In order to achieve the above objects, the invention provides a graphics card firmware updating method for fast startup setting of a Windows computer operating system after replacing the graphics card comprising following steps of: an electronic device receiving a boot signal to execute a Windows fast startup program, the electronic device having a storage unit to store an original graphics processing unit identification code; providing a replaced graphics card, the replaced graphics card comprising a microcontroller identification code and a firmware version of a microcontroller; a comparison unit of the electronic device comparing whether the microcontroller identification code of the replaced graphics card being the same as an original microcontroller identification code included in the comparison unit, the comparison unit further comprising a database, the database being a comparison table, the original microcontroller identification code being included in the database; if the comparison being the same, further comparing the firmware version of the replaced graphics card with a firmware update data version of the database, if the firmware version and the firmware update data version being compared to be different, the electronic device executing a firmware updating process.

Through the graphics card firmware updating system and the graphics card firmware updating method of the invention, the comparison unit of the electronic device comparing whether the microcontroller identification code of the replaced graphics card being the same as the original microcontroller identification code, if the microcontroller identification code of the replaced graphics card and the original microcontroller identification code being compared to be the same by the comparison unit, further comparing the firmware version of the replaced graphics card with the firmware update data version of the database, if the firmware version and the firmware update data version being compared to be different, the electronic device executing the firmware updating process; in other words, through the design of the invention, the updating system has at least one additional comparison process, in this way, the graphics card can be prevented from malfunctioning caused by subsequent firmware update error due to interpretation error of the conventional computer system, and maintenance cost caused by malfunction of the graphics card can be avoided.

DETAILED DESCRIPTION OF THE INVENTION

The above objects of the invention, as well as its structural and functional features, will be described in accordance with the preferred embodiments of the accompanying drawings.

Figure 1:
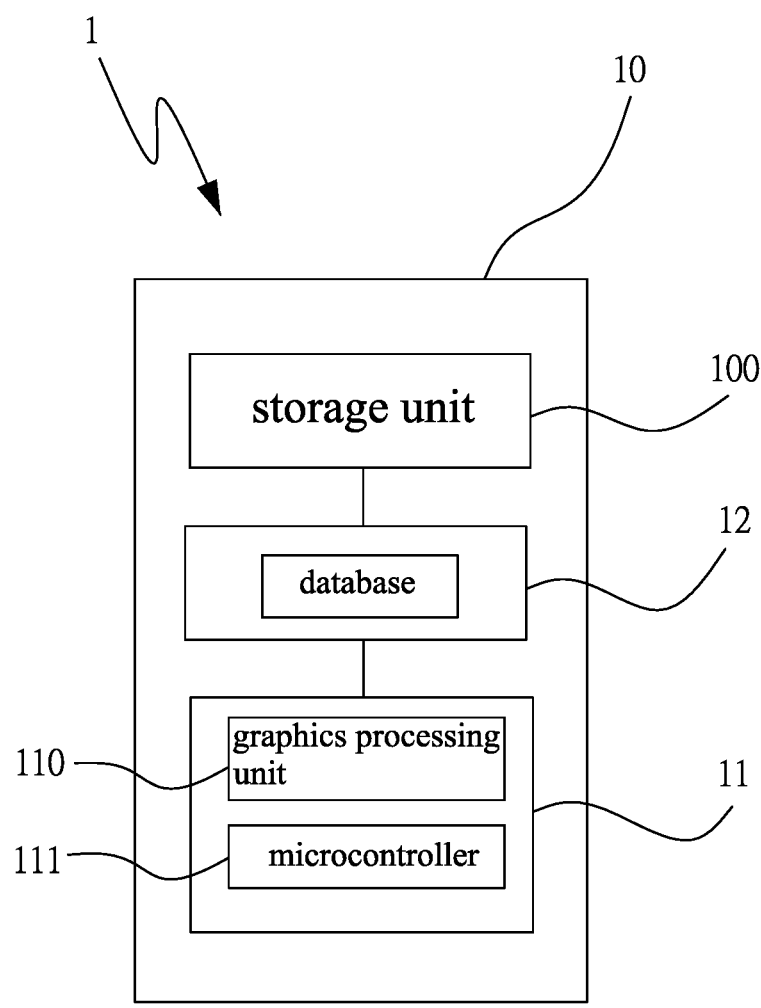
FIG. 1 is a block diagram of a first embodiment of a graphics card firmware updating system for fast startup setting of a Windows computer operating system after replacing the graphics card according to the invention.

Please refer to FIG. 1 for a block diagram of a first embodiment of a graphics card firmware updating system for fast startup setting of a Windows computer operating system after replacing the graphics card according to the invention. As shown in the figure, a graphics card firmware updating system for fast startup setting of a Windows computer operating system after replacing the graphics card comprises an electronic device 10, a replaced graphics card 11, and a comparison unit 12. The electronic device 10 can be a desktop computer and is used to receive a boot signal to cause the electronic device 10 to execute a Windows fast startup program. The electronic device 10 has a storage unit 100. The storage unit 100 is a hard disk. When the electronic device 10 is shut down, the system will store a large amount of data in the storage unit 100 to facilitate the realization that the computer system can quickly enter a working state when the computer is turned on the next time.

The replaced graphics card 11 is installed in the electronic device 10. The replaced graphics card 11 comprises a graphics processing unit 110 and a microcontroller 111. It should be noted that the so-called graphics processing unit 110 and microcontroller 111 in the specification of the invention respectively refer to the GPU and MCU that are well-known in the field of electronic technology. The GPU is mainly responsible for displaying and drawing related work items in the electronic device 10, and the MCU is responsible for calculating and processing data transmitted from a computer operating system.

The graphics processing unit 110 comprises a graphics processing unit identification code, and the microcontroller 111 comprises a microcontroller identification code and a firmware version. Of course, the replaced graphics card 11 is further composed of a memory, a circuit board, and a heat sink, but these components are not within the scope of explanation of the invention, so they will not be mentioned here.

During the Windows fast startup program being executed in the operating system of the electronic device 10, the operating system will read a representative code (that is, the so-called model of general products) of the graphics processing unit 110 included in the electronic device 10 at the moment of booting, and compare the representative code of the graphics processing unit 110 with an original graphics processing unit representative code included in the storage unit 100. If the comparison result is the same, the Windows fast startup program is completed; if the comparison result is different, the operating system will overpass the Windows fast startup program, and re-execute initialization of the hardware (please refer to FIG. 4 in conjunction with FIG. 1).

TABLE I

| Graphics card name | XC1 | XC2 | FTW1 | FTW2 | KP1 | KP2 |
|---|---|---|---|---|---|---|
| Graphics processing unit representative code | GPU3080 | GPU3090 | GPU3080 | GPU3090 | GPU3080 | GPU3090 |
| Graphics processing unit identification code | SSID1 | SSID2 | SSID3 | SSID4 | SSID5 | SSID6 |
| Microcontroller identification code | PID1 | PID2 | PID3 | PID4 | PID5 | PID6 |
| Firmware code | 1 | 1 | 2 | 2 | 3 | 3 |
| Firmware update data version | 1.0 | 1.1 | 2.0 | 2.3 | 3.1 | 3.2 |

Figure 2:
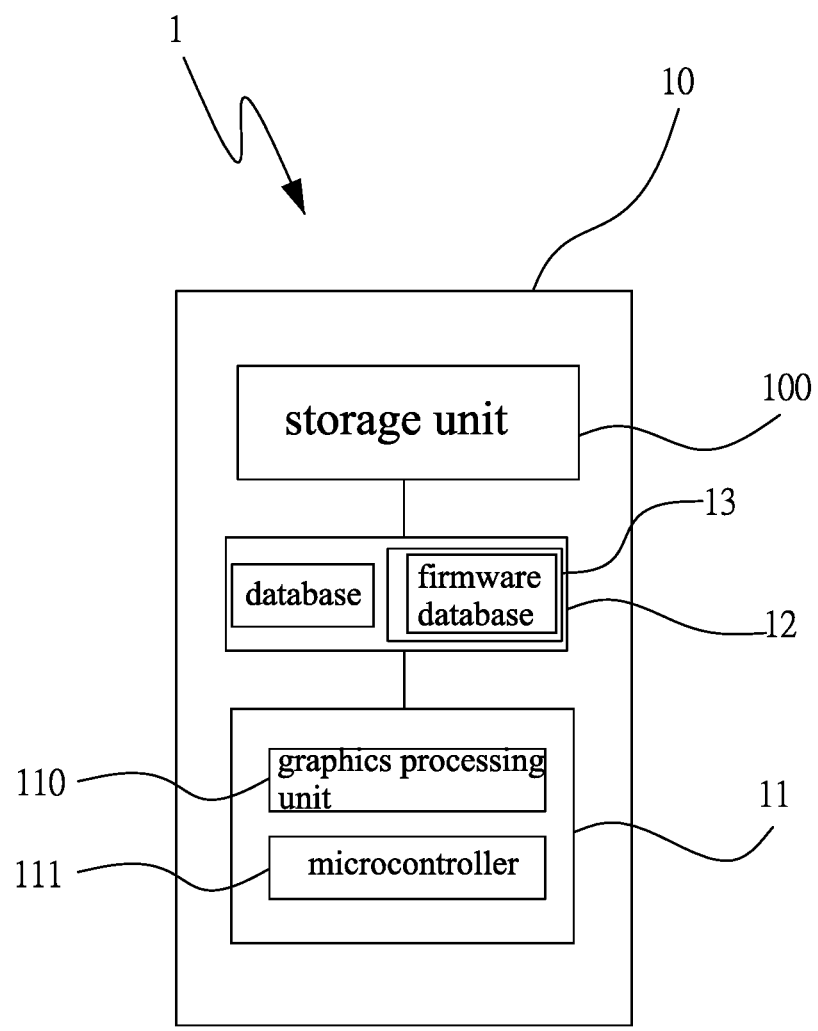
FIG. 2 is a block diagram of a second embodiment of the graphics card firmware updating system for fast startup setting of a Windows computer operating system after replacing the graphics card according to the invention.

The comparison unit 12 is executed by the electronic device 10 under the Windows fast startup setting. The comparison unit 12 represents an application program of the electronic device 10, the comparison unit 12 comprises a database, as shown in Table 1 above, the database is a comparison table. The database comprises a plurality of graphics processing unit identification codes, microcontroller identification codes, and firmware update data versions of all the graphics cards of a company that manufactures the replaced graphics card 11. It should be explained that, the data in the database will be continuously updated to keep the database provided with the latest data. That is to say, each of the graphics processing unit identification codes stored in the database has the corresponding microcontroller identification code, the original graphics processing unit identification code of the storage unit 100 is read by the comparison unit 12, and the corresponding microcontroller identification code is searched and found in the database. The "corresponding microcontroller identification code" mentioned here is a so-called original microcontroller identification code (so, it is substantively included in the comparison unit 12). Then the microcontroller identification code of the replaced graphics card 11 is read through a communication interface, so as to compare whether the microcontroller identification code of the replaced graphics card 11 is the same as the corresponding microcontroller identification code in the database, and execute a firmware updating process or a rebooting process on the electronic device 10 according to whether the comparison is the same. It should be explained that, the firmware updating process is executed by an update unit 13 (as shown in FIG. 2), and it should be noted that the firmware updating process captures the firmware from a firmware database in the update unit 13, and the firmware is installed in the replaced graphics card 11.

In addition, the database further comprises a firmware code, the firmware code can be regarded as a functionality of the replaced graphics card 11. Even if the representative codes (models) of two graphics cards are different, but because the firmware codes are the same (with the same function but different effects), the firmware can be used universally. Please refer to Table 1, replacing the graphics card XC1 with the graphics card XC2 in Table 1 is taken as an example, when the electronic device 10 is operating, although the firmware is updated under a condition that the two graphics cards have different representative codes, due to the firmware codes of the two graphics cards are the same (both are 1) and are compatible, even though an operating performance of the electronic device 10 is not in an optimal state, the operating system can still operate (for example, in an optimal performance the electronic device 10 being capable of controlling operation of three fans originally to achieve a heat dissipation effect may become only capable of controlling operation of two fans), which practically does not affect operation of the electronic device 10.

Figure 3:
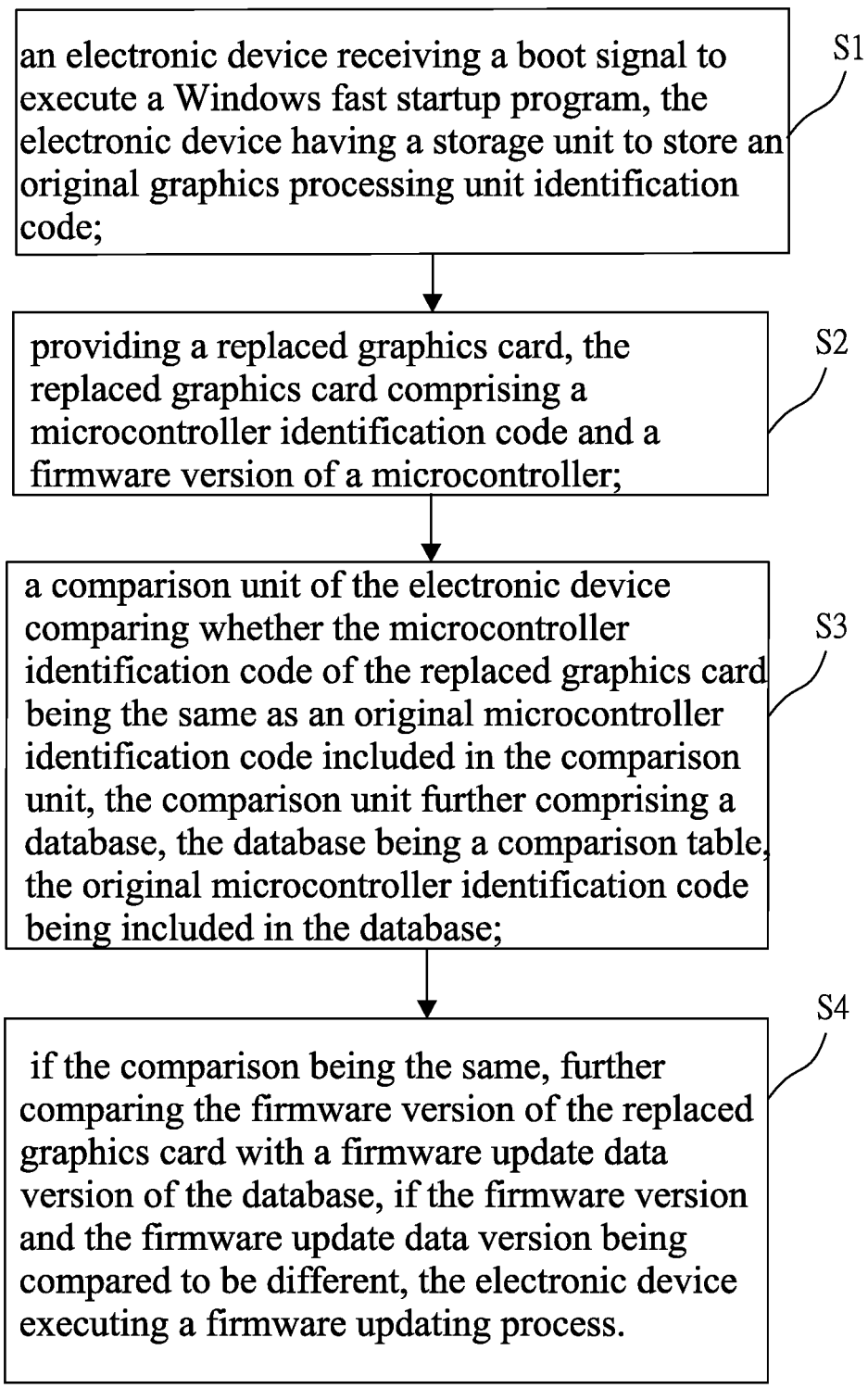
FIG. 3 is a flow chart of steps of a first embodiment of a graphics card firmware updating method for fast startup setting of a Windows computer operating system after replacing the graphics card according to the invention.
Figure 4:
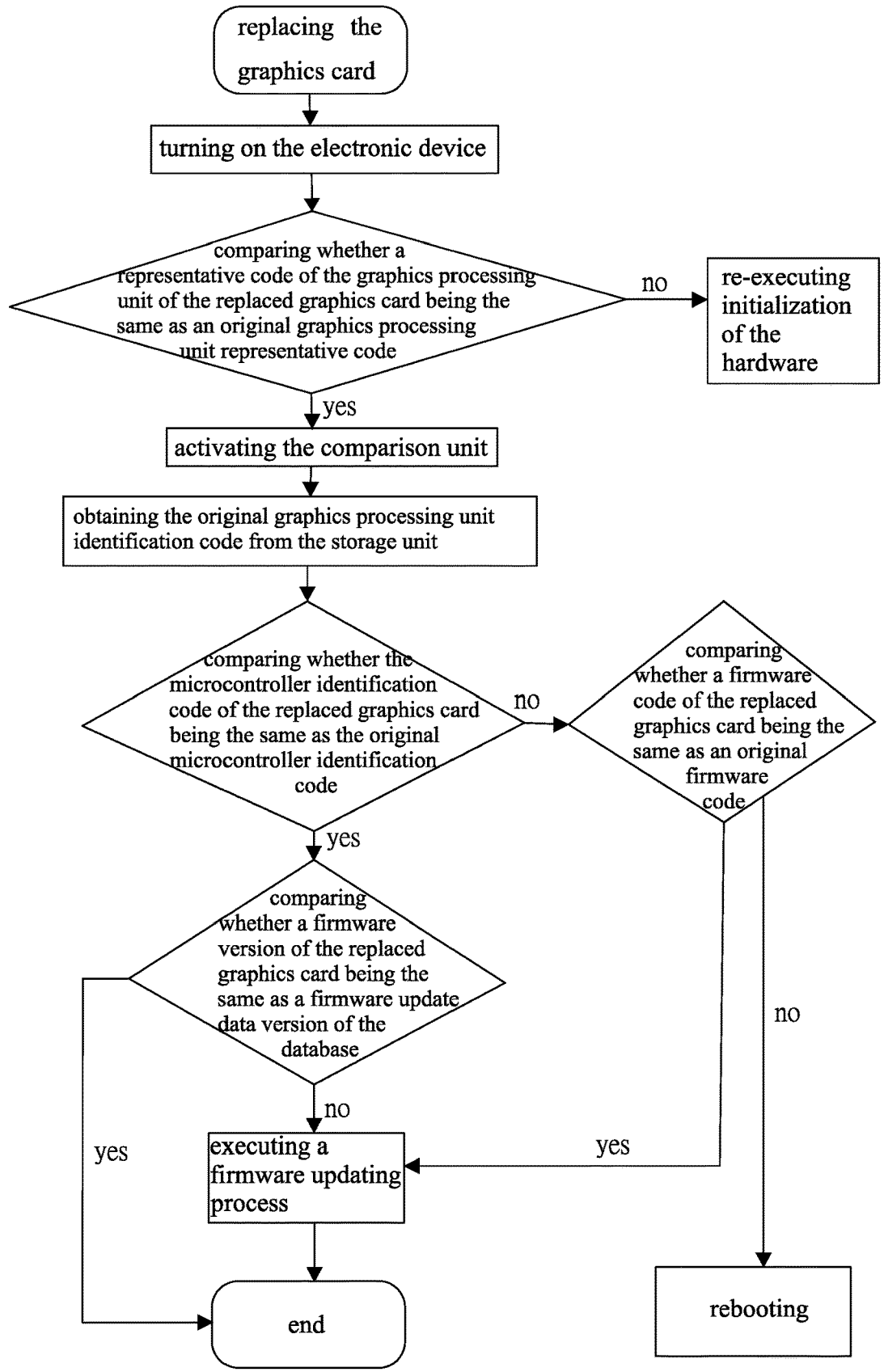
FIG. 4 is a schematic flow chart of the graphics card firmware updating method for fast startup setting of a Windows computer operating system after replacing the graphics card according to the invention.

Please refer to FIGS. 3 and 4 respectively for a flow chart of steps of a first embodiment of a graphics card firmware updating method for fast startup setting of a Windows computer operating system after replacing the graphics card according to the invention; and a schematic flow chart of the graphics card firmware updating method for fast startup setting of a Windows computer operating system after replacing the graphics card according to the invention. It can be known from FIG. 4 that in the invention, before turning on the electronic device 10, replacing the graphics card 11 first, and then turning on the electronic device 10 after completing replacement, at this time, the operating system reading a representative code (that being, the so-called model of general products) of the graphics processing unit 110 included in the electronic device 10 at the moment of booting, and comparing the representative code of the graphics processing unit 110 with an original graphics processing unit representative code included in the storage unit 100, if the comparison result being the same, the Windows fast startup program being completed; if the comparison result being different, the operating system overpassing the Windows fast startup program, and re-executing initialization of the hardware.

Figure 5:
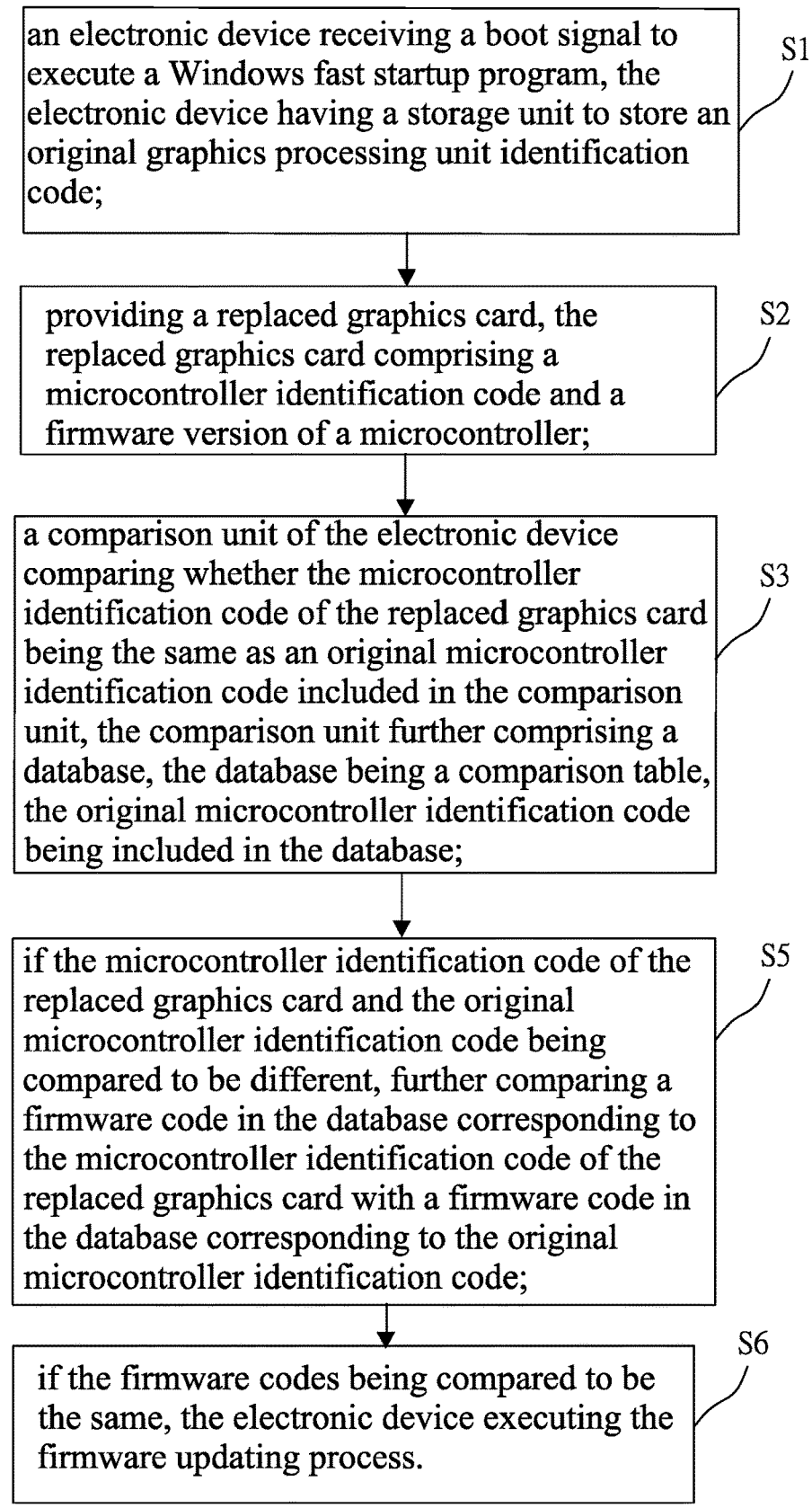
FIG. 5 is a flow chart of steps of a second embodiment of the graphics card firmware updating method for fast startup setting of a Windows computer operating system after replacing the graphics card according to the invention.
Figure 6:
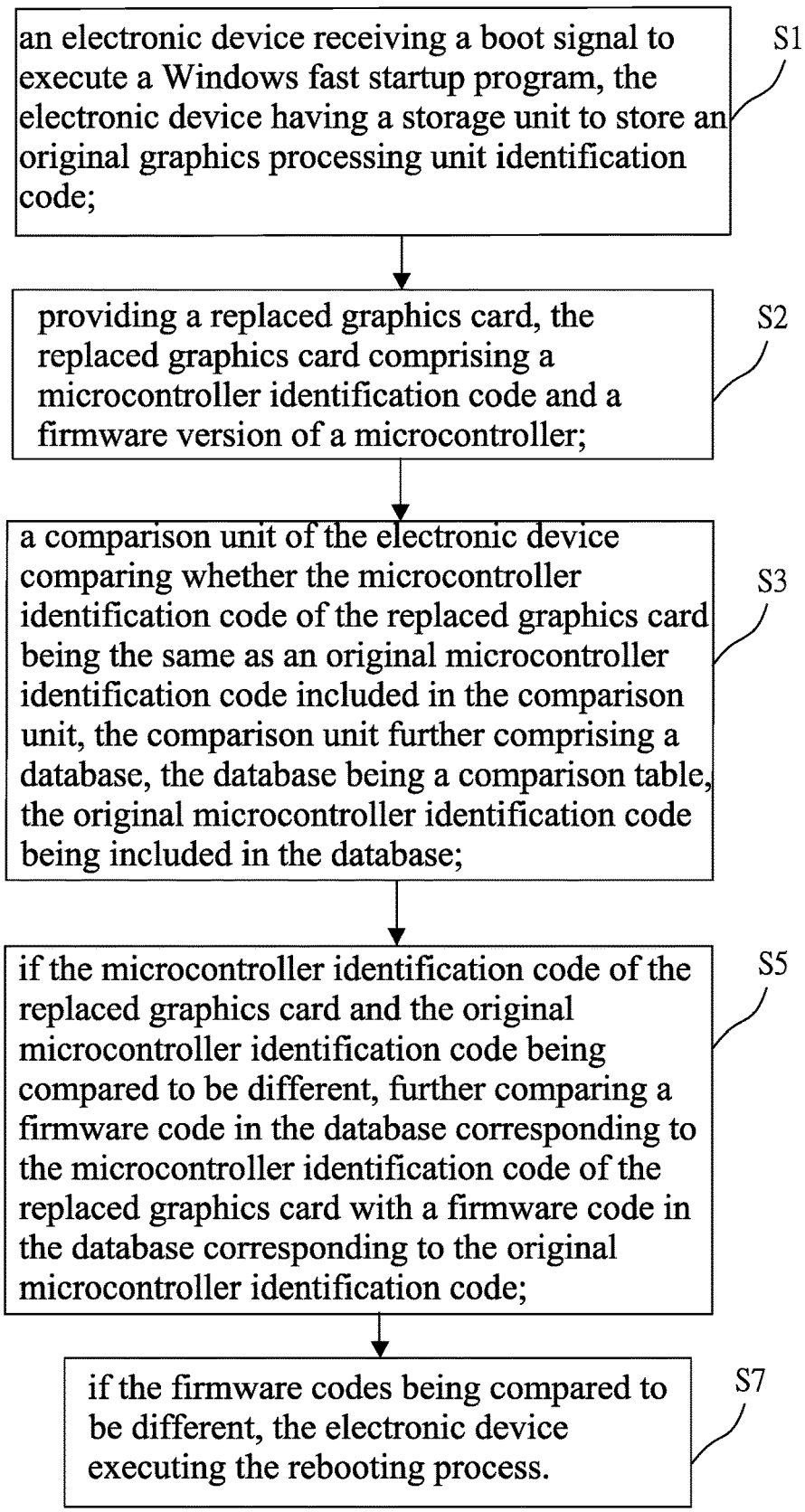
FIG. 6 is a flow chart of steps of a third embodiment of the graphics card firmware updating method for fast startup setting of a Windows computer operating system after replacing the graphics card according to the invention.

Then, the firmware updating method of the invention will be described, which comprises following steps of:

S1: an electronic device 10 receiving a boot signal to execute a Windows fast startup program, the electronic device 10 having a storage unit 100 to store an original graphics processing unit identification code;

providing the electronic device 10, the electronic device 10 being a desktop computer and used to receive a boot signal to cause the electronic device 10 executing a Windows fast startup program, the storage unit 100 of the electronic device 10 being a hard disk, when shutting down the electronic device 10, the system storing a large amount of data in the storage unit 100 to facilitate the realization that the computer system quickly entering a working state when turning on the electronic device 10 the next time;

S2: providing a replaced graphics card 11, the replaced graphics card 11 comprising a microcontroller identification code and a firmware version of a microcontroller 111;

providing the replaced graphics card 11, the replaced graphics card 11 being installed in the electronic device 10, the replaced graphics card 11 comprising a graphics processing unit 110 and a microcontroller 111, it should be noted that the so-called graphics processing unit 110 and microcontroller 111 in the specification of the invention respectively refer to the GPU and MCU that are well-known in the field of electronic technology, the GPU is mainly responsible for displaying and drawing related work items in the electronic device 10, and the MCU is responsible for calculating and processing data transmitted from a computer operating system, the graphics processing unit 110 comprising a graphics processing unit identification code, the microcontroller 111 comprising a microcontroller identification code and a firmware version;

S3: a comparison unit 12 of the electronic device 10 comparing whether the microcontroller identification code of the replaced graphics card 11 being the same as an original microcontroller identification code included in the comparison unit 12, the comparison unit 12 further comprising a database, the database being a comparison table, the original microcontroller identification code being included in the database;

executing the comparison unit 12 by the electronic device 10 under the Windows fast startup setting, the comparison unit 12 representing an application program of the electronic device 10, the comparison unit 12 comprising a database and a firmware update data version, the database being a comparison table (please refer to Table 1 above), the database comprising a plurality of graphics processing unit identification codes, microcontroller identification codes, and firmware update data versions of all the graphics cards of a company manufacturing the replaced graphics card 11; it should be explained that, the data in the database will be continuously updated to keep the database provided with the latest data, that is to say, each of the graphics processing units 110 stored in the database has the corresponding microcontroller identification code, the original graphics processing unit identification code of the storage unit 100 is read by the comparison unit 12, and the corresponding microcontroller identification code is searched and found in the database, the "corresponding microcontroller identification code" mentioned here is a so-called original microcontroller identification code (so, it is substantively included in the comparison unit 12); then reading the microcontroller identification code of the replaced graphics card 11 by a communication interface, comparing whether the microcontroller identification code of the replaced graphics card 11 being the same as the corresponding microcontroller identification code in the database;

S4: if the comparison being the same, further comparing the firmware version of the replaced graphics card 11 with a firmware update data version of the database, if the firmware version and the firmware update data version being compared to be different, the electronic device 10 executing a firmware updating process;

if the microcontroller identification code of the replaced graphics card 11 and the original microcontroller identification code being compared to be the same, further comparing the firmware version of the replaced graphics card 11 with the firmware update data version of the database, if the firmware version and the firmware update data version being compared to be different, the electronic device 10 executing a firmware updating process through an update unit 13;

please refer to FIG. 5 in conjunction with FIG. 4, FIG. 5 is a flow chart of steps of a second embodiment of the graphics card firmware updating method for fast startup setting of a Windows computer operating system after replacing the graphics card according to the invention, after step S3: comparing whether the microcontroller identification code of the replaced graphics card 11 being the same as the original microcontroller identification code, further comprising:

S5: if the microcontroller identification code of the replaced graphics card 11 and the original microcontroller identification code being compared to be different, further comparing a firmware code in the database corresponding to the microcontroller identification code of the replaced graphics card 11 with a firmware code in the database corresponding to the original microcontroller identification code;

the premise of this step being that if the microcontroller identification code of the replaced graphics card 11 and the original microcontroller identification code being compared to be different, from the database (please refer to Table 1 above) the comparison unit 12 capturing and comparing a firmware code in the database corresponding to the microcontroller identification code of the replaced graphics card 11 with a firmware code in the database corresponding to the original microcontroller identification code, so the firmware codes being substantively included in the comparison unit 12;

S6: if the corresponding firmware codes being compared to be the same, the electronic device 10 executing the firmware updating process;

if the comparison unit 12 comparing the firmware codes to be the same, the electronic device 10 executing the firmware updating process; and please refer to FIG. 6 in conjunction with FIG. 4, FIG. 6 is a flow chart of steps of a third embodiment of the graphics card firmware updating method for fast startup setting of a Windows computer operating system after replacing the graphics card according to the invention, after step S5: further comparing the firmware code in the database corresponding to the microcontroller identification code of the replaced graphics card 11 with the firmware code in the database corresponding to the original microcontroller identification code, further comprising:

S7: if the corresponding firmware codes being compared to be different, the electronic device 10 executing the rebooting process;

if the comparison unit 12 comparing the firmware codes to be different, the electronic device 10 executing the rebooting process, that being, re-initializing the electronic device 10.

Therefore, through the graphics card firmware updating system and the graphics card firmware updating method of the invention, the comparison unit 12 of the electronic device 10 comparing whether the microcontroller identification code of the replaced graphics card 11 being the same as the original microcontroller identification code, if the microcontroller identification code of the replaced graphics card 11 and the original microcontroller identification code being compared to be the same by the comparison unit 12, further comparing the firmware version of the replaced graphics card 11 with the firmware update data version of the database, if the firmware version and the firmware update data version being compared to be different, the electronic device 10 executing the firmware updating process; in other words, through the design of the invention, the updating system has at least one additional comparison process, in this way, the graphics card 11 can be prevented from malfunctioning caused by subsequent firmware update error due to interpretation error of the conventional computer system, and maintenance cost caused by malfunction of the graphics card 11 can be avoided.

In summary, the invention has the following advantages over the prior art:

1. malfunction of the graphics card can be prevented; and
2. maintenance cost caused by malfunction of the graphics card can be avoided.

The basic principles, main features and advantages of the invention have been shown and described above. Those skilled in the art should understand that the invention is not limited by the above-mentioned embodiments. Descriptions in the above-mentioned embodiments and specification merely illustrate the principles of the invention, without departing from the spirit and scope of the invention, the invention will have various changes and improvements, all these changes and improvements shall fall within the scope of protection of the invention, and the scope of protection of the invention is defined by the appended claims and their equivalents.

What is claimed is:

1. A graphics card firmware updating system for fast startup setting of a Windows™ computer operating system after replacing a graphics card comprising:
   an electronic device receiving a boot signal to execute a Windows™ fast startup program, the electronicdevice having a storage unit, the storage unit comprising an original graphics processing unit identification code;
   a new graphics card installed in the electronicdevice, the new graphics card comprising a microcontroller, the microcontroller comprising a microcontroller identification code and a firmware version; and
   a comparison unit executed by the electronicdevice, the comparison unit further comprising a database in addition to the original graphics processing unit identification code read from the storage unit, the database being a comparison table, the database comprising an original microcontroller identification code and a firmware update data version, the comparison unit comparing whetherthe microcontroller identification code of the new graphics card beingthe same as the original microcontroller identification code during the Windows™ fast startup setting, and executing a firmware updating process or a rebooting process on the electronicdevice according to whetherthe comparison being the same or not.

2. The graphics card firmware updating system for fast startup setting of a Windows™ computer operating system after replacing the graphics card as claimed in claim 1, wherein the comparison unit further has an update unit for executing the firmware updating process, the firmware updating process captures firmware from a firmware database in the update unit, and the firmware is installed in the new graphics card.

3. The graphics card firmware updating system for fast startup setting of a Windows™ computer operating system after replacing the graphics card as claimed in claim 1, wherein the comparison unit compares whether the original microcontroller identification code is the same as the microcontroller identification code of the new graphics card, if the same, further compares the firmware version of the new graphics card with the firmware update data version of the database, if the firmware version and the firmware update data version are compared to be the same, the firmware updating process does not need to be executed, if the firmware version and the firmware update data version are compared to be different, the electronic device executes the firmware updating process.

4. The graphics card firmware updating system for fast startup setting of a WindowsTM computer operating system after replacing the graphics card as claimed in claim 1, wherein the database further comprises a firmware code, the comparison unit compares whetherthe original microcontroller identification code is the same as the microcontroller identification code of the new graphics card, if different, furthercompares a firmware code corresponding to the microcontroller identification code of the new graphics card with a firmware code corresponding to the original microcontroller identification code, if the compared firmware codes are the same, the electronic device executes the firmware updating process.

5. The graphics card firmware updating system for fast startup setting of a Windows™ computer operating system after replacing the graphics card as claimed in claim 4, wherein if the compared firmware codes are the same, the electronic device executes the rebooting process.

6. A graphics card firmware updating method for fast startup setting of a Windows™ computer operating system after replacing a graphics card comprisingfollowing steps of:
   an electronic device receiving a boot signal to execute a Windows™ fast startup program, the electronicdevice having a storage unit storing an original graphics processing unit identification code;
   providing a new graphics card, the new graphics card comprising a microcontroller identification code and a firmware version of a microcontroller;
   a comparison unit of the electronicdevice comparing whetherthe microcontroller identification code of the new graphics card beingthe same as an original microcontroller identification code included in the comparison unit, the comparison unit further comprising a database, the database being a comparison table, the original microcontroller identification code being included in the database; and
   if the comparison beingthe same, furthercomparing the firmware version of the new graphics card with a firmware update data version of the database, if the firmware version and the firmware update data version being compared to be different, the electronic device executing a firmware updating process.

7. The graphics card firmware updating method for fast startup setting of a Windows™ computer operating system after replacing the graphics card as claimed in claim 6, wherein afterthe step of comparing whetherthe microcontroller identification code of the new graphics card beingthe same as the original microcontroller identification code, further comprising:
   if the microcontroller identification code of the new graphics card and the original microcontroller identification code being compared to be different, further comparing a firmware code in the database corresponding to the microcontroller identification code of the new graphics card with a firmware code in the database corresponding to the original microcontroller identification code; and if the compared firmware codes are the same, the electronic device executing the firmware updating process.

8. The graphics card firmware updating method for fast startup setting of a Windows™ computeroperating system after replacing the graphics card as claimed in claim 7, wherein afterthe step of further comparing the firmware code in the database corresponding to the microcontroller identification code of the new graphics card with the firmware code in the database corresponding to the original microcontroller identification code, further comprising:

if the compared firmware codes are the same, the electronic device executing a rebooting process.

9. The graphics card firmware updating method for fast startup setting of a Windows™ computer operating system after replacing the graphics card as claimed in claim 6, wherein the comparison unit further has an update unit for executing the firmware updating process, the firmware updating process captures firmware from a firmware database in the update unit, and the firmware is installed in the new graphics card.

* * * * *